(12) United States Patent
Morimura et al.

(10) Patent No.: US 10,930,153 B2
(45) Date of Patent: Feb. 23, 2021

(54) VEHICLE EXTERNAL NOTIFICATION DEVICE

(71) Applicant: TOYOTA JIDOSHA KABUSHIKI KAISHA, Toyota (JP)

(72) Inventors: Junichi Morimura, Shizuoka (JP); Junya Watanabe, Shizuoka (JP); Seiji Arakawa, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 16/010,569

(22) Filed: Jun. 18, 2018

(65) Prior Publication Data

US 2019/0043362 A1 Feb. 7, 2019

(30) Foreign Application Priority Data

Aug. 1, 2017 (JP) .............................. JP2017-149299

(51) Int. Cl.
| | |
|---|---|
| *G08G 1/16* | (2006.01) |
| *G05D 1/00* | (2006.01) |
| *G06N 5/04* | (2006.01) |
| *B60Q 1/52* | (2006.01) |
| *B60W 30/095* | (2012.01) |
| *B60Q 1/00* | (2006.01) |
| *G06N 7/00* | (2006.01) |

(52) U.S. Cl.
CPC .......... *G08G 1/166* (2013.01); *B60Q 1/0035* (2013.01); *B60Q 1/525* (2013.01); *B60W 30/095* (2013.01); *G05D 1/0088* (2013.01); *G06N 5/04* (2013.01); *G06N 7/005* (2013.01)

(58) Field of Classification Search
None
See application file for complete search history.

(56) References Cited

U.S. PATENT DOCUMENTS

| | | | | |
|---|---|---|---|---|
| 8,954,252 B1 * | 2/2015 | Urmson | ................. | G08G 1/166 180/167 |
| 9,196,164 B1 * | 11/2015 | Urmson | ................. | G08G 1/166 |

(Continued)

FOREIGN PATENT DOCUMENTS

| | | |
|---|---|---|
| JP | 2008-090748 A | 4/2008 |
| JP | 2008230568 A | 10/2008 |

(Continued)

*Primary Examiner* — Nay Tun
*Assistant Examiner* — Shawna M Kingston
(74) *Attorney, Agent, or Firm* — Sughrue Mion, PLLC

(57) ABSTRACT

Provided is a vehicle external notification device including a first notification unit that gives notice of information on an action schedule so as to be recognizable from the front of a host vehicle, a second notification unit that gives notice of the information so as to be recognizable from the side of the host vehicle, an action schedule unit that predicts a future action of a pedestrian, a parallel advance prediction unit that predicts whether or not the pedestrian advances in parallel with the host vehicle, and a notification control unit that causes the first notification unit to give notice of the information when it is predicted that the pedestrian does not advance in parallel with the host vehicle, and causes the second notification unit to give notice of the information when it is predicted that the pedestrian advances in parallel with the host vehicle.

2 Claims, 9 Drawing Sheets

(56) References Cited

U.S. PATENT DOCUMENTS

| | | | | |
|---|---|---|---|---|
| 2012/0056734 A1* | 3/2012 | Ikeda | ............... | G08G 1/165 |
| | | | | 340/425.5 |
| 2016/0121791 A1* | 5/2016 | Shimizu | ............ | G08G 1/166 |
| | | | | 340/435 |
| 2017/0140651 A1* | 5/2017 | Lee | ............ | G08G 1/166 |
| 2017/0359565 A1* | 12/2017 | Ito | ............ | H04N 5/225 |

FOREIGN PATENT DOCUMENTS

| JP | 2015186944 A | 10/2015 |
|---|---|---|
| JP | 2016166013 A | 9/2016 |

\* cited by examiner

4b(4)

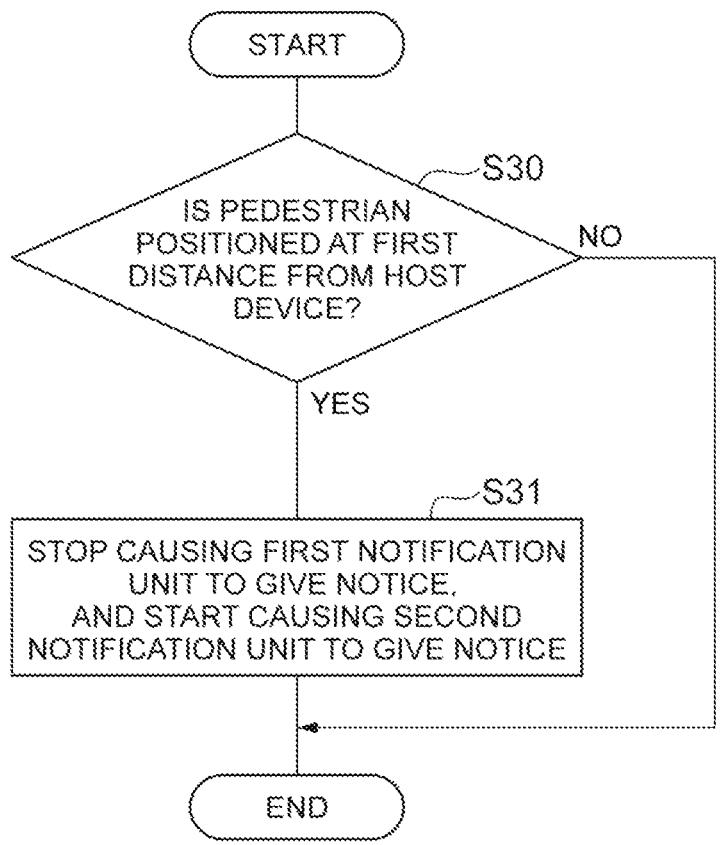

VEHICLE EXTERNAL NOTIFICATION DEVICE

CROSS-REFERENCE TO RELATED APPLICATION

This application claims the benefit of priority from Japanese Patent Application No. 2017-149299, filed Aug. 1, 2017, the entire contents of which are incorporated herein by reference.

TECHNICAL FIELD

The present disclosure relates to a vehicle external notification device.

BACKGROUND

A warning device for vehicle disclosed in Japanese Unexamined Patent Publication No. 2008-90748 outputs a warning for informing a pedestrian or the like that there is a possibility of turning vehicle accidents, when an object detected in a turning vehicle accident region which is set obliquely behind a vehicle is determined to be the pedestrian or the like on the basis of its shape.

SUMMARY

In the above-described warning device for vehicle, for example, in a situation where a vehicle approaches a pedestrian or the like and passes by the vicinity thereof, a warning is not output while the pedestrian or the like is positioned in front of or at the side of the vehicle, and is output then for the first time when the pedestrian or the like is positioned obliquely behind the vehicle. Consequently, it is desired that the warning is output at an earlier stage to the pedestrian or the like so as to inform the pedestrian or the like that there is a possibility of collision with the vehicle.

However, while the pedestrian or the like is positioned before the vehicle, a positional relationship between the pedestrian or the like and the vehicle changes depending on a future action of the pedestrian or the like. For this reason, even when a warning is output to the pedestrian or the like at an earlier stage, there is a concern that the pedestrian or the like cannot recognize the warning depending on a future positional relationship between the pedestrian or the like and the vehicle.

Consequently, in this technical field, a vehicle external notification device is desired which is capable of predicting a future action of a moving object such as a pedestrian and giving notice in accordance with the predicted action.

According to an aspect of the present disclosure, there is provided a vehicle external notification device that gives notice of information on a future action schedule of a host vehicle during automatic driving so as to be recognizable from an outside of a vehicle, the vehicle external notification device including a first notification unit that gives notice of the information on the action schedule so as to be recognizable from a front of the host vehicle, a second notification unit that gives notice of the information on the action schedule so as to be recognizable from a side of the host vehicle, a moving object detection unit that detects a moving object in a vicinity of the host vehicle, an action schedule unit that predicts a future action of the moving object which is detected in front of the host vehicle by the moving object detection unit, a parallel advance prediction unit that predicts whether or not the moving object advances in parallel with the host vehicle, on the basis of the action schedule and the future action of the moving object which is predicted by the action schedule unit, and a notification control unit that causes the first notification unit to give notice of the information on the action schedule when the parallel advance prediction unit predicts that the moving object does not advance in parallel with the host vehicle, and causes the second notification unit to give notice of the information on the action schedule at a timing when the moving object is positioned at a first distance from the host vehicle in a traveling direction of the host vehicle, when the parallel advance prediction unit predicts that the moving object advances in parallel with the host vehicle.

According to the vehicle external notification device, it is predicted whether or not the moving object advances in parallel with the host vehicle, on the basis of the future action schedule of the host vehicle during automatic driving and the predicted future action of the moving object which is detected in front of the host vehicle. When it is predicted that the moving object does not advance in parallel with the host vehicle, the first notification unit gives notice of the information on the future action schedule of the host vehicle so as to be recognizable from the front of the host vehicle. Thereby, this device can notify the moving object, who is predicted not to advance in parallel with the host vehicle, of the information on the future action schedule of the host vehicle even when the moving object is positioned in front of the host vehicle. On the other hand, when it is predicted that the moving object advances in parallel with the host vehicle, the second notification unit gives notice of the information on the future action schedule of the host vehicle so as to be recognizable from the side of the host vehicle at a timing when the moving object is positioned at a first distance from the host vehicle in a traveling direction of the host vehicle. Thereby, this device can notify the moving object, who is predicted to advance in parallel with the host vehicle, of the information on the future action schedule of the host vehicle, for example, at a timing when a positional relationship making it easier for the moving object to recognize information notified at the side of the host vehicle than information notified in front of the host vehicle is established before the host vehicle V passes by the vicinity of the moving object. Accordingly, this device can predict the future action of the moving object and can give notice in accordance with the predicted action.

According to the aspect of the present disclosure, the vehicle external notification device further includes a minimum distance acquisition unit configured to acquire a minimum distance which is a distance when the moving object and the host vehicle are closest to each other, on the basis of the action schedule and the future action of the moving object which is predicted by the action schedule unit, in which the notification control unit may cause the first notification unit or the second notification unit to give notice of information indicating that the host vehicle yields a course to the moving object, as the information on the action schedule, when the minimum distance acquired by the minimum distance acquisition unit is less than a second distance, and may cause the first notification unit or the second notification unit to give notice of information indicating that the host vehicle does not yield a course to the moving object, as the information on the action schedule, as the information on the action schedule, when the minimum distance acquired by the minimum distance acquisition unit is equal to or greater than the second distance. Thereby, the host vehicle can select a more preferred action as an action schedule regarding whether to yield the course to the moving object on the basis of the minimum distance between the host vehicle and the moving object, and can inform the moving object of the action schedule.

According to various aspects of the present disclosure, it is possible to predict a future action of a moving object such as a pedestrian and to give notice in accordance with the predicted action.

BRIEF DESCRIPTION OF THE DRAWINGS

FIG. 9 is a flowchart illustrating a process of changing notification means.

DETAILED DESCRIPTION

Figure 1:
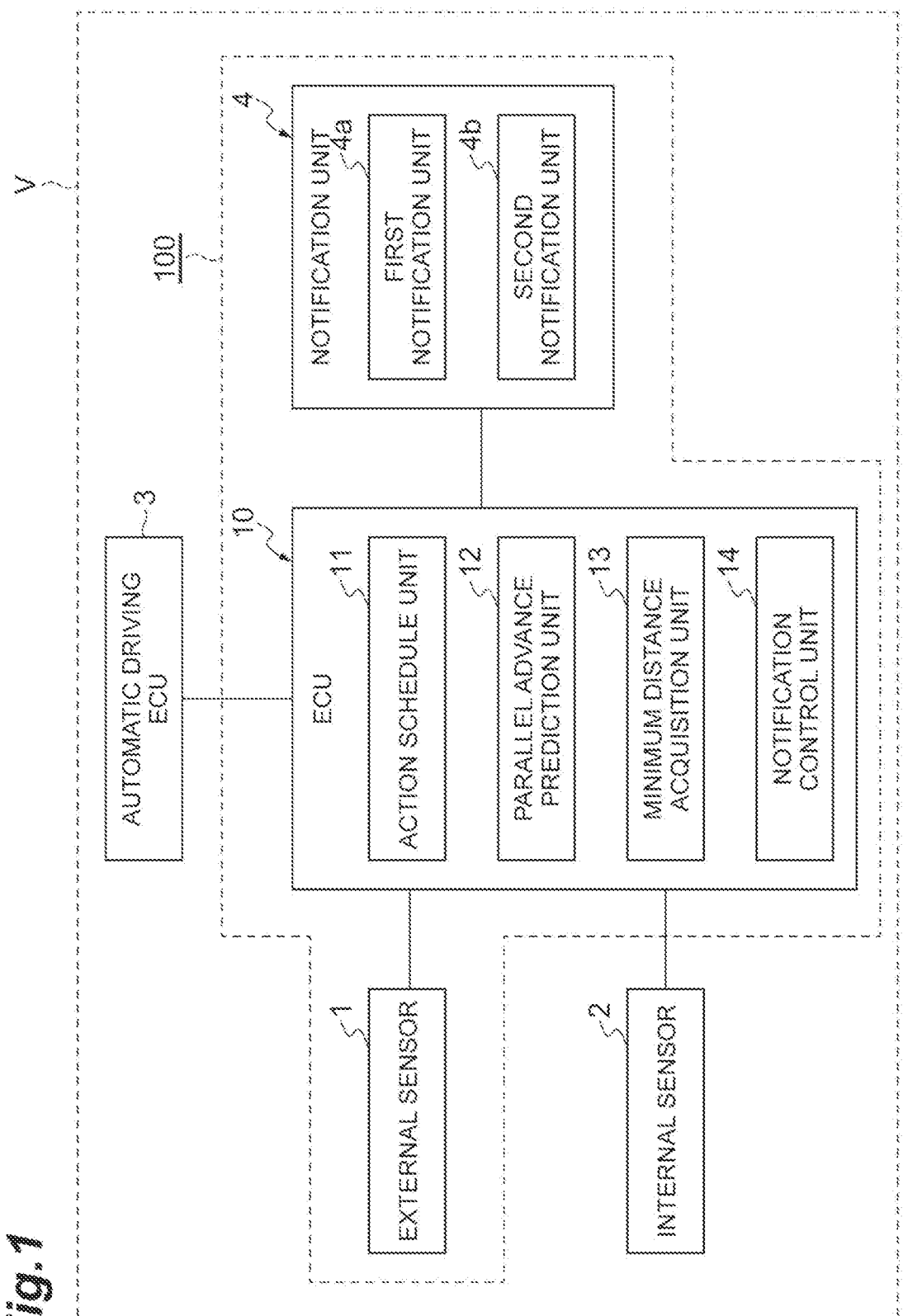
FIG. 1 is a block diagram illustrating a vehicle external notification device according to this embodiment.

Hereinafter, an exemplary embodiment will be described with reference to the accompanying drawings. Meanwhile, in the drawings, the same or equivalent portions are denoted by the same reference numerals and signs, and a repeated description will be omitted.

FIG. 1 is a block diagram illustrating a vehicle external notification device 100 according to this embodiment. As illustrated in FIG. 1, the vehicle external notification device 100 is a device which is mounted on a host vehicle V, such as an automobile, which is capable of automatic driving, and gives notice of information so as to be recognizable from the outside of the host vehicle V. The automatic driving is vehicle control for causing the host vehicle V to automatically travel along a target route which is set in advance. In the automatic driving, a driver does not need to perform a driving operation, and the host vehicle V automatically travels. In this embodiment, the vehicle external notification device 100 displays the information so as to be recognizable from the outside of the vehicle.

The information notified by the vehicle external notification device 100 includes information on a future action schedule of the host vehicle V during the automatic driving. The "action schedule of the host vehicle V" is, for example, a traveling plan for causing the host vehicle V to automatically travel along a target route (details will be described later).

The vehicle external notification device 100 includes an Electronic Control Unit (ECU) 10 that generally controls the device, and an external sensor (moving object detection unit) 1 and a notification unit 4 which are connected to the ECU 10. An internal sensor 2 and an automatic driving ECU 3 are further connected to the ECU 10. The ECU 10 is an electronic control unit including a Central Processing Unit (CPU), a Read Only Memory (ROM), a Random Access Memory (RAM), a Controller Area Network (CAN) communication circuit, and the like.

The ECU 10 is connected to a network for communication using, for example, the CAN communication circuit, and is communicably connected to components of the host vehicle V. That is, the ECU 10 can refer to detection results of the external sensor 1 and the internal sensor 2 and a future action schedule (that is, a traveling plan) of the host vehicle V which is generated in the automatic driving ECU 3. The ECU 10 can output a signal to the notification unit 4.

The ECU 10 loads programs stored in, for example, the ROM into the RAM, and executes the programs loaded into the RAM by the CPU to realize functions of vehicle external notification to be described later. The ECU 10 may be constituted by a plurality of ECUs.

The external sensor 1 is a detection apparatus that detects circumstances in the vicinity of the host vehicle V. The external sensor 1 detects, for example, a moving object in the vicinity of the host vehicle V, and detects a positional relationship between the detected moving object and the host vehicle V. The external sensor 1 is mounted on the host vehicle V so as to be capable of detecting a moving object positioned at least in front of and at the side of the host vehicle V. The external sensor 1 includes at least one of a camera and a radar sensor. The moving object includes, for example, a pedestrian, a bicycle, a two-wheeled vehicle, and the like. Hereinafter, a pedestrian will be described as an example of the moving object.

The camera is an image capture apparatus that captures an image of an external state of the host vehicle V. The camera transmits image capture information on the external state of the host vehicle V to the ECU 10. The camera may be a monocular camera or a stereo camera. The stereo camera includes two image capture units that are disposed so as to reproduce binocular parallax. Image capture information of the stereo camera also includes information (distance information) regarding a depth direction of a captured image.

The radar sensor is a detection apparatus that detects an obstacle in the vicinity of the host vehicle V by using radio waves (for example, millimeter waves) or light. The radar sensor includes, for example, a millimeter wave radar or a Light Detection and Ranging (LIDAR). The radar sensor transmits the radio waves or light to the vicinity of the host vehicle V, and receives the radio waves or light reflected by an obstacle to detect the obstacle. The radar sensor transmits the detected obstacle information to the ECU 10. The obstacle includes a guardrail, a building, and the like which are fixed obstacles, in addition to a moving object, such as a pedestrian, which is a moving obstacle.

The internal sensor 2 is a detection apparatus that detects a traveling state and a vehicle state of the host vehicle V. The internal sensor 2 includes, for example, a vehicle speed sensor.

The vehicle speed sensor is a detector that detects a vehicle speed of the host vehicle V. The vehicle speed sensor is provided in, for example, a wheel of the host vehicle V, a drive shaft that rotating integrally with the wheel, or the like, and a wheel speed sensor that detects the rotation speed of the wheel is used as the vehicle speed sensor. The vehicle speed sensor transmits the detected vehicle speed information to the ECU 10.

The automatic driving ECU 3 executes automatic driving of the host vehicle V. The automatic driving ECU 3 is an electronic control unit including a CPU, a ROM, a RAM, a CAN communication circuit, and the like. The automatic driving ECU 3 is connected to a map database that stores map information, a positioning unit that measures the position of the host vehicle V on a map by a Global Positioning System (GPS), various actuators for causing the host vehicle V to travel, and various sensors.

The automatic driving ECU 3 is connected to a network for communication using, for example, a CAN communication circuit, and is communicably connected to components of the host vehicle V. That is, the automatic driving ECU 3 can refer to the map information of the map database, the positional information of the host vehicle V on the map which is measured by the positioning unit, and detection results of the various sensors. The ECU 10 can output signals to the various actuators.

The automatic driving ECU 3 loads programs stored in, for example, the ROM into the RAM, and executes the programs loaded into the RAM by the CPU to realize functions of the automatic driving system mounted on the host vehicle V. The automatic driving ECU 3 may be constituted by a plurality of ECUs.

The map information of the map database includes, for example, positional information of a road (positional information for each traffic lane), information on the shape of a road (information such as a type of curve or linear portion and the curvature of a curve), information on the width of a road (information on the width of a traffic lane), information on a gradient of a road, information on a cant angle of a road, and information on a vehicle speed limit in a road. The various actuators include a steering actuator that controls a steering angle of the host vehicle V, a brake actuator that controls a brake system of the host vehicle V, and an engine actuator that controls an engine (or a motor of an electric car) of the host vehicle V.

The automatic driving ECU 3 retrieves a target route from the present position of the host vehicle V to a destination, on the basis of the map information of the map database, the positional information of the host vehicle V on the map which is measured by the positioning unit, and a destination which s set in advance. The automatic driving ECU 3 generates an action schedule (that is, a traveling plan) for causing the host vehicle V to travel along the target route. The action schedule includes, for example, a moving path T1 and a moving speed (see FIG. 4). The automatic driving ECU 3 generates an action schedule of the host vehicle V by a well-known method. The automatic driving ECU 3 executes automatic driving of the host vehicle V along the action schedule, on the basis of the positional information of the host vehicle V on the map which is measured by the positioning unit. The automatic driving ECU 3 transmits control signals to the various actuators to control the host vehicle V and execute automatic driving.

Figure 2:
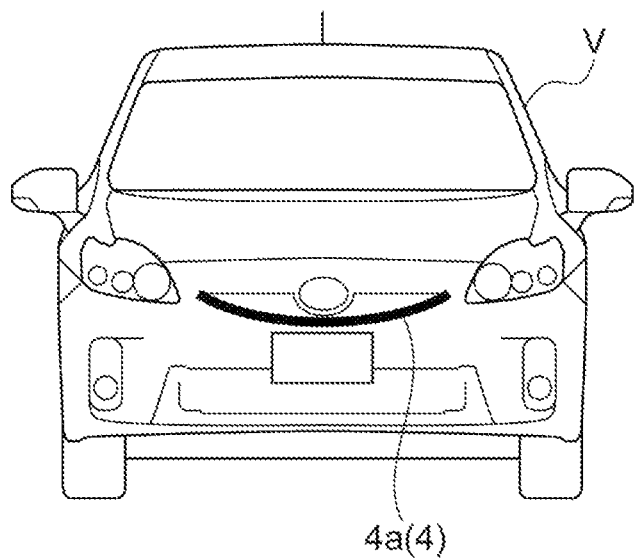
FIG. 2 is a front view of a host vehicle.
Figure 3:
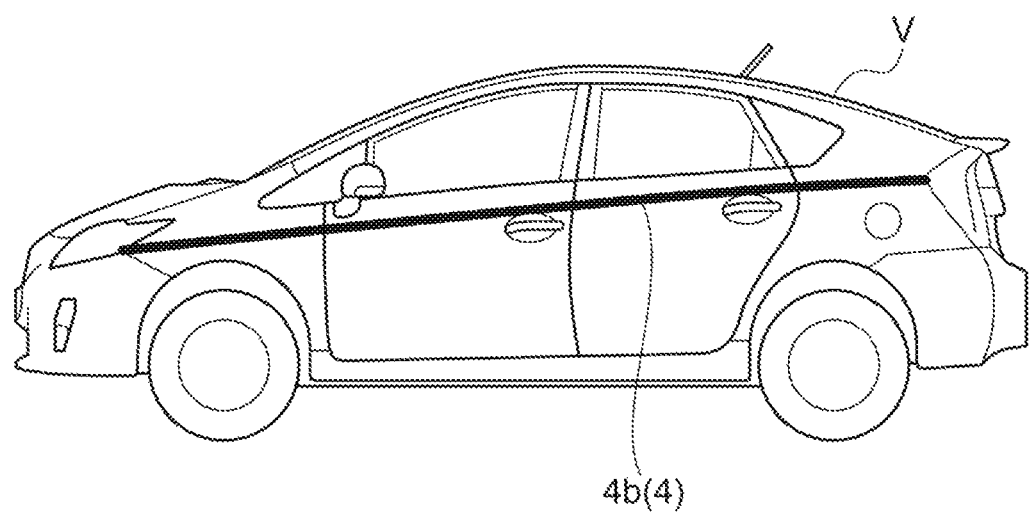
FIG. 3 is a side view of the host vehicle.

FIG. 2 is a front view of the host vehicle V. FIG. 3 is a side view of the host vehicle V. The notification unit 4 illustrated in FIGS. 1 to 3 is a display device that displays information on a future action schedule of the host vehicle V so as to be visually recognizable from the outside of the vehicle. The notification unit 4 includes a first notification unit 4a and a second notification unit 4b.

The first notification unit 4a is a display device that displays information on the future action schedule of the host vehicle V so as to be visually recognizable from the front of the host vehicle V. The first notification unit 4a is provided on the front surface of the host vehicle V. In more detail, the first notification unit 4a is configured such that a plurality of Light Emitting Diodes (LEDs) are disposed in a row in the width direction of the host vehicle V along the outer edge of a grill (front grill) on the front surface of the host vehicle V. The first notification unit 4a can change the color of display, the cycle of flickering, and the like. Meanwhile, the first notification unit 4a is not limited to the aspect illustrated in FIG. 2.

The second notification unit 4b is a display device that displays information on the future action schedule of the host vehicle V so as to be visually recognizable from the side of the host vehicle V. The second notification unit 4b is provided on the side surface of the host vehicle V. In more detail, the second notification unit 4b is configured such that a plurality of LEDs are disposed in a row in a front-back direction of the host vehicle V along the side surface of the host vehicle V. The second notification unit 4b is also provided not only on the left side surface illustrated in FIG. 3 but also on the right side surface of the host vehicle V. The second notification unit 4b can change the color of display, the cycle of flickering, and the like. Meanwhile, the second notification unit 4b is not limited to the aspect illustrated in FIG. 3.

Next, a mechanical configuration of the ECU 10 will be described with situations illustrated in FIGS. 4 and 5 as examples.

Figure 4:
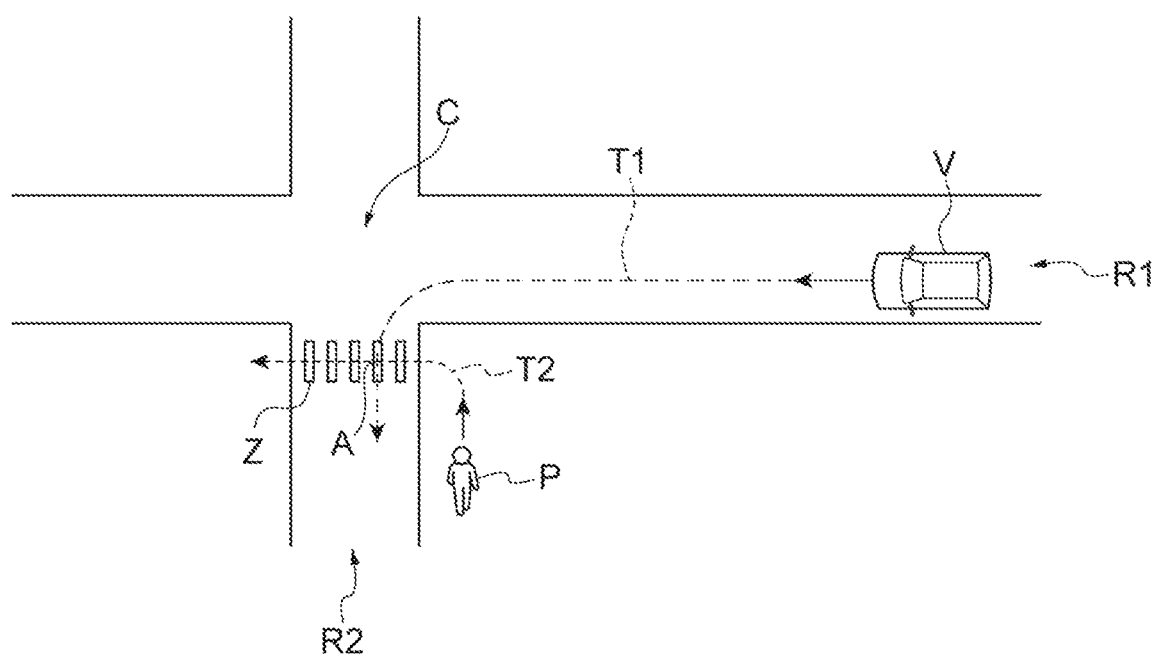
FIG. 4 is a plan view illustrating a situation where a pedestrian predicted not to be advanced in parallel with the host vehicle is positioned before the host vehicle.

FIG. 4 is a plan view illustrating a situation where a pedestrian P predicted not to be advanced in parallel with the host vehicle V is positioned before the host vehicle V. FIG. 4 illustrates the vicinity of an intersection C between roads R1 and R2. The host vehicle V travels along the road R1 toward the intersection C on a moving path T1. The pedestrian P walks toward the intersection C along the road R2. A pedestrian crossing Z is provided near the intersection C of the road R2 in a destination where the pedestrian P walks and heads for.

Figure 5:
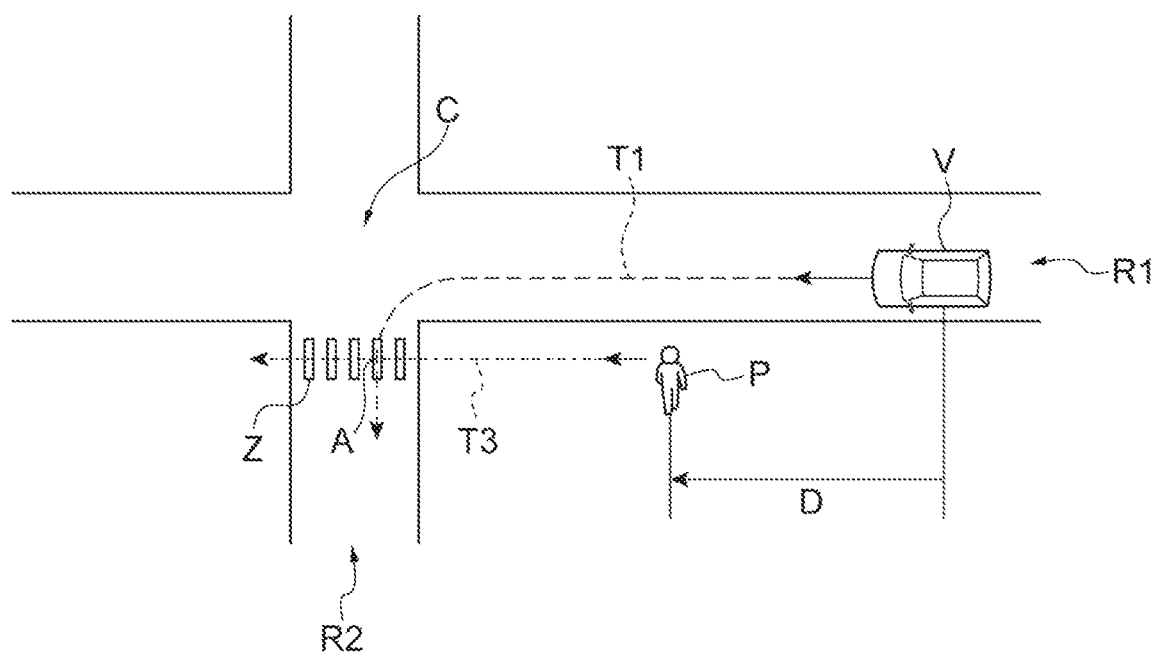
FIG. 5 is a plan view illustrating a situation where a pedestrian predicted to be advanced in parallel with the host vehicle is positioned before the host vehicle.

FIG. 5 is a plan view illustrating a situation where the pedestrian P predicted to be advanced in parallel with the host vehicle V is positioned before the host vehicle V. FIG. 5 illustrates the vicinity of the intersection C between the roads R1 and R2. The host vehicle V travels along the road R1 toward the intersection C on the moving path T1. The pedestrian P walks toward the intersection C along the road R1. The pedestrian P is positioned at a distance D from the host vehicle V in the traveling direction of the host vehicle V. The pedestrian crossing Z is provided near the intersection C of the road R2 in a destination where the pedestrian P walks and heads for.

As illustrated in FIG. 1, the ECU 10 includes an action schedule unit 11, a parallel advance prediction unit 12, a minimum distance acquisition unit 13, and a notification control unit 14. Meanwhile, a portion of the functions of the ECU 10 may be executed by a computer in an institution, such as an information management center, which is capable of communicating with the host vehicle V, or may be executed by a portable information terminal which is capable of communicating with the host vehicle V.

As illustrated in FIGS. 1, 4, and 5, the action schedule unit 11 predicts a future action of the pedestrian P who is detected in front of the host vehicle V by the external sensor 1. In more detail, the action schedule unit 11 predicts a future action of the pedestrian P, who is detected in front of the host vehicle V by the external sensor 1, by using known prediction means on the basis of information (image capture information, obstacle information) received from the external sensor 1, map information of the map database, and positional information of the host vehicle V on the map which is measured by the positioning unit. The "future action of the pedestrian P" includes, for example, moving paths T2 and T3 and a moving speed of the pedestrian P. The "known prediction means" may be prediction means based on the theory of probability assuming, for example, a traffic rule and the like, or may be specifically prediction means using a particle filter, a Kalman filter, and the like using a Monte Carlo method. In FIG. 4, the action schedule unit 11 predicts that the pedestrian P walks toward the intersection C along the road R2 and then turns left to cross the pedestrian crossing Z, as the moving path T2 of the pedestrian P. In FIG. 5, the action schedule unit 11 predicts that the pedestrian P walks toward the intersection C along the road R1 and then goes straight to cross the pedestrian crossing Z, as the moving path T3 of the pedestrian P.

The parallel advance prediction unit 12 predicts whether or not the pedestrian P advances in parallel with the host vehicle V, on the basis of the future action of the pedestrian P and the action schedule of the host vehicle V which are predicted by the action schedule unit 11. The "pedestrian advancing in parallel with the host vehicle V" means that a traveling direction of the pedestrian P in the moving path and a traveling direction of the host vehicle V in the moving path are substantially consistent with each other in a situation where the pedestrian P is positioned in the vicinity on the side of the host vehicle V. Examples of the "vicinity on the side of the host vehicle V" include a region on the side of the host vehicle V in a sidewalk, a side strip, and the like provided together with a roadway where the host vehicle V is traveling.

The minimum distance acquisition unit 13 predicts whether or not the moving paths T2 and T3 of the pedestrian P and the moving path T1 of the host vehicle V intersect each other, on the basis of the future action of the pedestrian P which is predicted by the action schedule unit 11 and the action schedule of the host vehicle V. In FIGS. 4 and 5, it is predicted that the moving paths T2 and T3 of the pedestrian P and the moving path T1 of the host vehicle V intersect each other in a place A of the road R2 on the pedestrian crossing Z.

In addition, the minimum distance acquisition unit 13 acquires a minimum distance which is a distance when the pedestrian P and the host vehicle V are closest to each other, on the basis of the future action of the pedestrian P which is predicted by the action schedule unit 11 and the action schedule of the host vehicle V. In FIGS. 4 and 5, the minimum distance is a distance between the host vehicle V and the pedestrian P in the vicinity of the place A where the moving paths T2 and T3 of the pedestrian P and the moving path T1 of the host vehicle V intersect each other. Meanwhile, the minimum distance acquisition unit 13 may not acquire the minimum distance, for example, when it is predicted that the moving paths T2 and T3 of the pedestrian P and the moving path T1 of the host vehicle V do not intersect each other.

The notification control unit 14 determines information on the action schedule of the host vehicle V, which is to be notified by the notification unit 4, on the basis of the minimum distance acquired by the minimum distance acquisition unit 13. For example, the notification control unit 14 compares the minimum distance with a second distance which is set in advance to determine information on the action schedule of the host vehicle V to be notified to the notification unit 4 on the basis of the comparison results. Meanwhile, the "second distance" is set to be a distance between the pedestrian P and the host vehicle V which does not lead to a concern that the action of the pedestrian P is interrupted even when the host vehicle V temporarily stops or passes without reducing its speed, for example, in a place where the pedestrian P and the host vehicle V are closest to each other.

In more detail, the notification control unit 14 determines to cause the notification unit 4 to give notice of information indicating that the host vehicle V yields the course to the pedestrian P, when the minimum distance is less than the second distance. The "host vehicle V yielding the course to the pedestrian P" means that, for example, the host vehicle V temporarily stops or reduces its speed so that the pedestrian P can pass by the place where the pedestrian P and the host vehicle V are closest to each other, before the host vehicle V. For example, the notification control unit 14 may display the notification unit 4 in a predetermined color or may adopt the flickering of the notification unit 4 by a predetermined number of times at a predetermined cycle, in order to inform the pedestrian P that the host vehicle V yields the course to the pedestrian P. As a more specific example, the notification control unit 14 may adopt the display of the notification unit 4 in red or blue which is a color easily giving the pedestrian P a feeling of relief, in order to inform the pedestrian P that the host vehicle V yields the course to the pedestrian P, or may adopt the flickering of the notification unit 4 twice or three times at low speed (for example, once per second).

On the other hand, the notification control unit 14 determines to cause the notification unit 4 to give notice of information indicating that the host vehicle V does not yield the course to the pedestrian P, when the minimum distance is equal to or greater than the second distance. The "host vehicle V not yielding the course to the pedestrian P" means that the host vehicle V passes by the place where the pedestrian P and the host vehicle V are closest to each other before the pedestrian P, for example, in a situation where there is no concern that the action of the pedestrian P is interrupted even when the host vehicle V temporarily stops or reduces its speed. For example, the notification control unit 14 may display the notification unit 4 in a predetermined color or may adopt the flickering of the notification unit 4 by a predetermined number of times at a predetermined cycle, in order to inform the pedestrian P that the host vehicle V does not yield the course to the pedestrian P. As a more specific example, the notification control unit 14 may adopt the display of the notification unit 4 in red or yellow which is a color easily giving the pedestrian P wariness in order to inform the pedestrian P that the host vehicle V does not yield the course to the pedestrian P, or may adopt the continuous flickering of the notification unit 4 at high speed (for example, twice per second) until the host vehicle V passes by the place.

In addition, the notification control unit 14 causes the notification unit 4 to give notice of information on the action schedule of the host vehicle V. For example, when the parallel advance prediction unit 12 predicts that the pedestrian P does not advance in parallel with the host vehicle V as illustrated in FIG. 4, the notification control unit 14 causes the first notification unit 4a to give notice of the information on the action schedule of the host vehicle V. Thereby, it is possible to recognize the information on the action schedule of the host vehicle V from the front of the host vehicle V.

On the other hand, when the parallel advance prediction unit 12 predicts that the pedestrian P advances in parallel with the host vehicle V as illustrated in FIG. 5, the notification control unit 14 causes the first notification unit 4a to give notice of the information on the action schedule of the host vehicle V, until a timing when the distance D between the host vehicle V and the pedestrian P is set to be a first distance which is set in advance (that is, a timing when the pedestrian P is positioned at the first distance from the host vehicle V in the traveling direction of the host vehicle V).

Thereby, it is possible to recognize the information on the action schedule of the host vehicle V from the front of the host vehicle V.

When the parallel advance prediction unit 12 predicts that the pedestrian P advances in parallel with the host vehicle V, the notification control unit 14 causes the first notification unit 4a to stop giving notice of the information on the action schedule of the host vehicle V and causes the second notification unit 4b to give notice of the information on the action schedule of the host vehicle V, at a timing when the distance D between the host vehicle V and the pedestrian P is set to be the first distance. Thereby, it is possible to recognize the information on the action schedule of the host vehicle V from the side of the host vehicle V. Meanwhile, in this case, the notification control unit 14 may cause the first notification unit 4a to stop giving notice of the information on the action schedule of the host vehicle V.

Meanwhile, the "first distance" is a distance that makes it easier for the pedestrian P to recognize information notified at the side of the host vehicle V by the second notification unit 4b than information notified in front of the host vehicle V by the first notification unit 4a, when the distance D is equal to or less than the first distance. The first distance may be, for example, 10 m, 5 m, or 1 m. Alternatively, the first distance may fluctuate depending on a distance between the host vehicle V and the pedestrian P in the width direction of the host vehicle V. In addition, the "timing when the distance D between the host vehicle V and the pedestrian P is set to be the first distance" is not necessarily severely limited to a point in time when the distance D between the host vehicle V and the pedestrian P is set to be the first distance, and may deviate by a fixed time (or a fixed distance) from a point in time when the distance D between the host vehicle V and the pedestrian P is set to be the first distance.

The notification control unit 14 terminates the notification performed by the first notification unit 4a or the second notification unit 4b when the host vehicle V sufficiently recedes from the vicinity of the pedestrian P when the first notification unit 4a or the second notification unit 4b is caused to give notice of the information on the action schedule of the host vehicle V. Meanwhile, the "sufficiently receding" may be, for example, a case where the host vehicle V recedes from the pedestrian P to a position where there is no possibility of collision with the vehicle of the pedestrian P or there is an extremely low possibility of collision with the vehicle.

Figure 6:
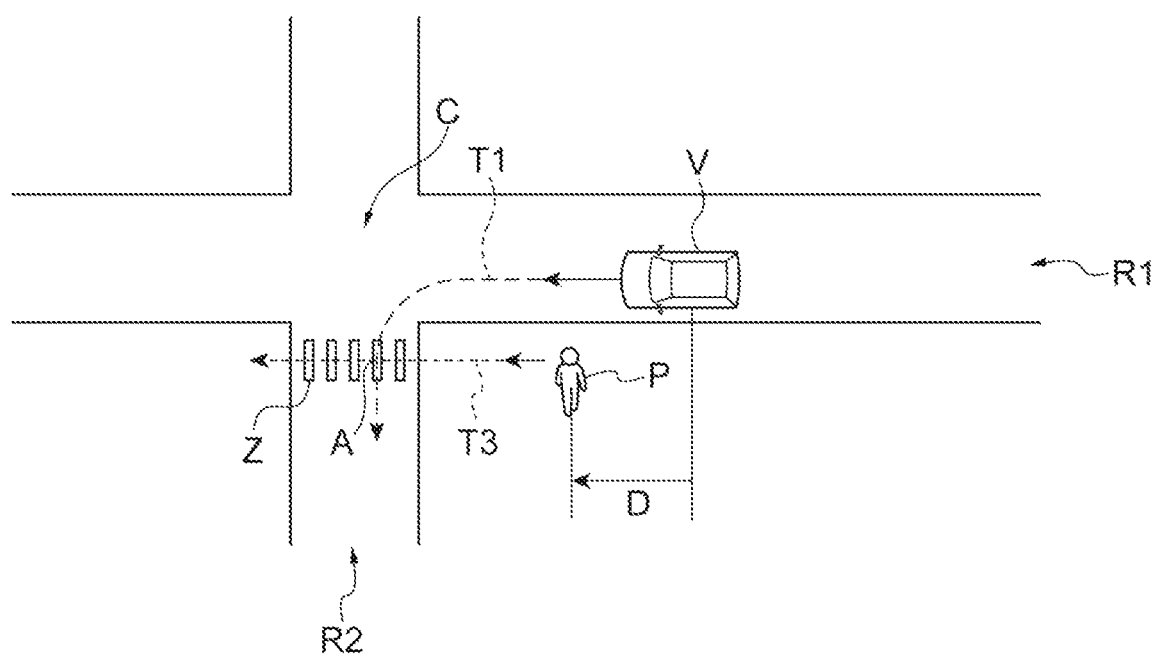
FIG. 6 is a plan view illustrating a situation where the pedestrian of FIG. 5 is positioned at a first distance from the host vehicle.
Figure 7:
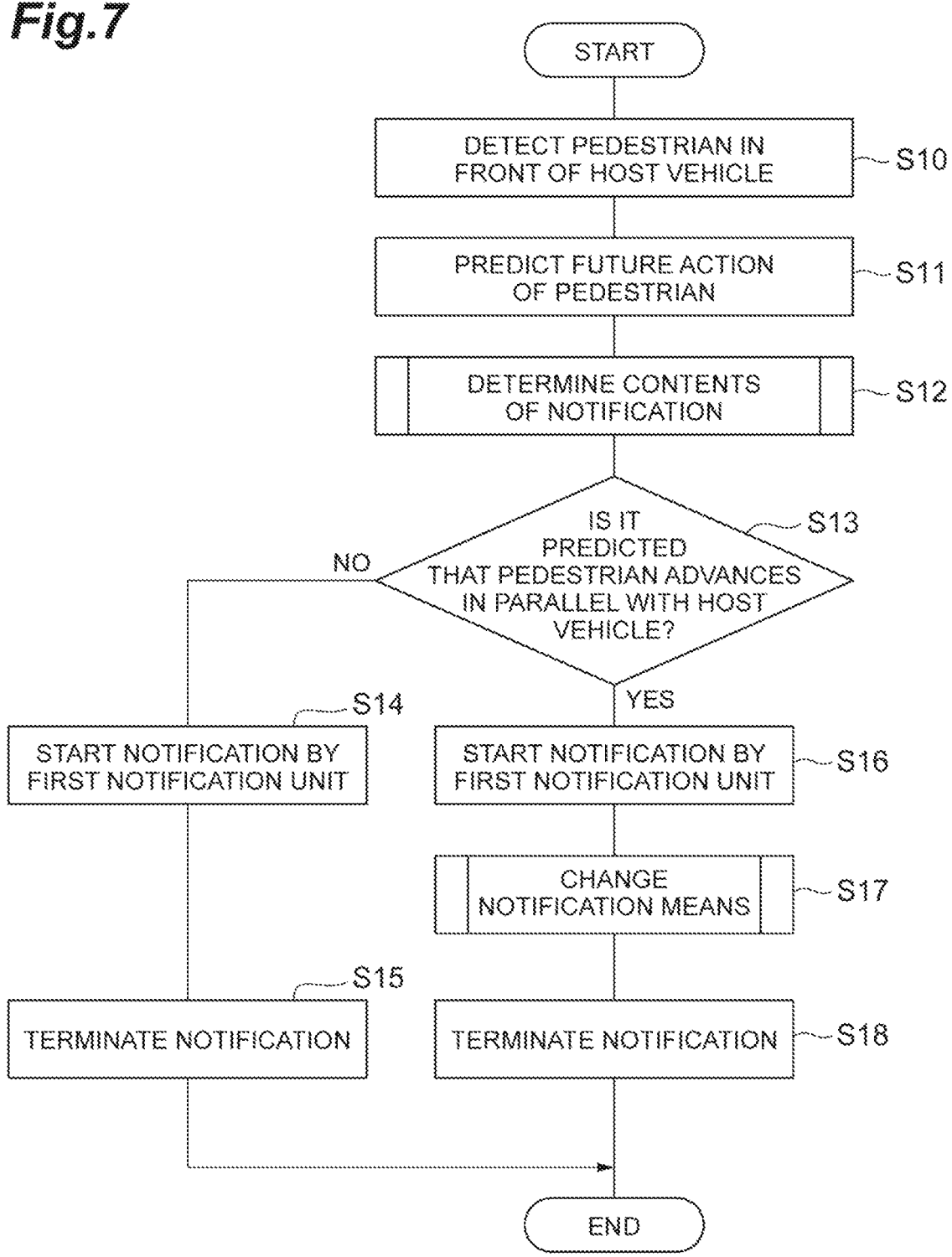
FIG. 7 is a flowchart illustrating a notification process.

Hereinafter, an information notification process of the vehicle external notification device 100 will be described with reference to the situations of FIGS. 4 to 6. FIG. 7 is a flowchart illustrating a notification process. The flowchart of FIG. 7 is executed when the host vehicle V is in an automatic driving mode.

As illustrated in FIG. 7, in step S10, the vehicle external notification device 100 detects a moving object in the vicinity of the host vehicle V by the external sensor 1. In FIGS. 4 and 5, the pedestrian P in front of the host vehicle V is detected. Thereafter, the vehicle external notification device 100 proceeds to step S11.

In step S11, the ECU 10 of the vehicle external notification device 100 predicts a future action of the pedestrian P, who is detected in front of the host vehicle V by the external sensor 1, by the action schedule unit 11. In FIG. 4, the action schedule unit 11 predicts that the pedestrian P walks toward the intersection C along the road R2 and then turns left to cross the pedestrian crossing Z, as the moving path T2 of the pedestrian P. In FIG. 5, the action schedule unit 11 predicts that the pedestrian P walks toward the intersection C along the road R1 and then goes straight to cross the pedestrian crossing Z, as the moving path T3 of the pedestrian P. Thereafter, the vehicle external notification device 100 proceeds to step S12.

In step S12, the ECU 10 of the vehicle external notification device 100 determines information on the action schedule of the host vehicle V, which is to be notified by the notification unit 4, by the notification control unit 14 (details will be described later). Thereafter, the vehicle external notification device 100 proceeds to step S13.

In step S13, the ECU 10 of the vehicle external notification device 100 predicts whether or not the pedestrian P advances in parallel with the host vehicle V, by the parallel advance prediction unit 12. The parallel advance prediction unit 12 predicts whether or not the pedestrian P advances in parallel with the host vehicle V, on the basis of the future action of the pedestrian P and the action schedule of the host vehicle V which are predicted by the action schedule unit 11. In FIG. 4, the parallel advance prediction unit 12 predicts that the pedestrian P does not advance in parallel with the host vehicle V. When it is predicted that the pedestrian P does not advance in parallel with the host vehicle V (step S13: NO), the vehicle external notification device 100 proceeds to step S14. On the other hand, in FIG. 5, the parallel advance prediction unit 12 predicts that the pedestrian P advances in parallel with the host vehicle V. When it is predicted that the pedestrian P advances in parallel with the host vehicle V step S13: YES), the vehicle external notification device 100 proceeds to step S16.

In step S14, the ECU 10 of the vehicle external notification device 100 causes the first notification unit 4a to give notice of the information on the action schedule of the host vehicle V by the notification control unit 14. Thereby, it is possible to recognize the information on the action schedule of the host vehicle V from the front of the host vehicle V. That is, the information on the action schedule of the host vehicle V can be visually recognized by the pedestrian P positioned in front of the host vehicle V. Thereafter, the vehicle external notification device 100 proceeds to step S15.

In step S15, the ECU 10 of the vehicle external notification device 100 stops causing the first notification unit 4a to give notice of the information on the action schedule of the host vehicle V by the notification control unit 14, when the host vehicle V sufficiently recedes from the vicinity of the pedestrian P. When the ECU stops causing the first notification unit 4a to give notice of the information on the action schedule of the host vehicle V, the vehicle external notification device 100 terminates the current process. Thereafter, the vehicle external notification device 100 repeatedly performs the process from step S10 again.

In step S16, the ECU 10 of the vehicle external notification device 100 causes the first notification unit 4a to give notice of the information on the action schedule of the host vehicle V by the notification control unit 14 until a timing when the distance D between the host vehicle V and the pedestrian P is set to be the first distance which is set in advance. Thereby, it is possible to recognize the information on the action schedule of the host vehicle V from the front of the host vehicle V. That is, the information on the action schedule of the host vehicle V can be visually recognized by the pedestrian P positioned in front of the host vehicle V. Thereafter, the vehicle external notification device 100 proceeds to step S17.

In step S17, the ECU 10 of the vehicle external notification device 100 changes notification means by the notification control unit 14. The notification control unit 14 stops causing the first notification unit 4a to give notice of the information on the action schedule of the host vehicle V and causes the second notification unit 4b to give notice of the information on the action schedule of the host vehicle V, at a timing when the distance D between the host vehicle V and the pedestrian P is set to be the first distance which is set in advance, as illustrated in FIG. 6 (details will be described later). Thereafter, the vehicle external notification device 100 proceeds to step S18.

In step S18, the ECU 10 of the vehicle external notification device 100 stops causing the second notification unit 4b to give notice of the information on the action schedule of the host vehicle V by the notification control unit 14, when the host vehicle V passes by the vicinity of the pedestrian P and sufficiently recedes from the pedestrian P. When the ECU stops causing the second notification unit 4b to give notice of the information on the action schedule of the host vehicle V, the vehicle external notification device 100 terminates the current process. Thereafter, the vehicle external notification device 100 repeatedly performs the process from step S10 again. Meanwhile, the flowchart of FIG. 7 is also terminated, for example, when the automatic driving of the host vehicle V is terminated.

Figure 8:
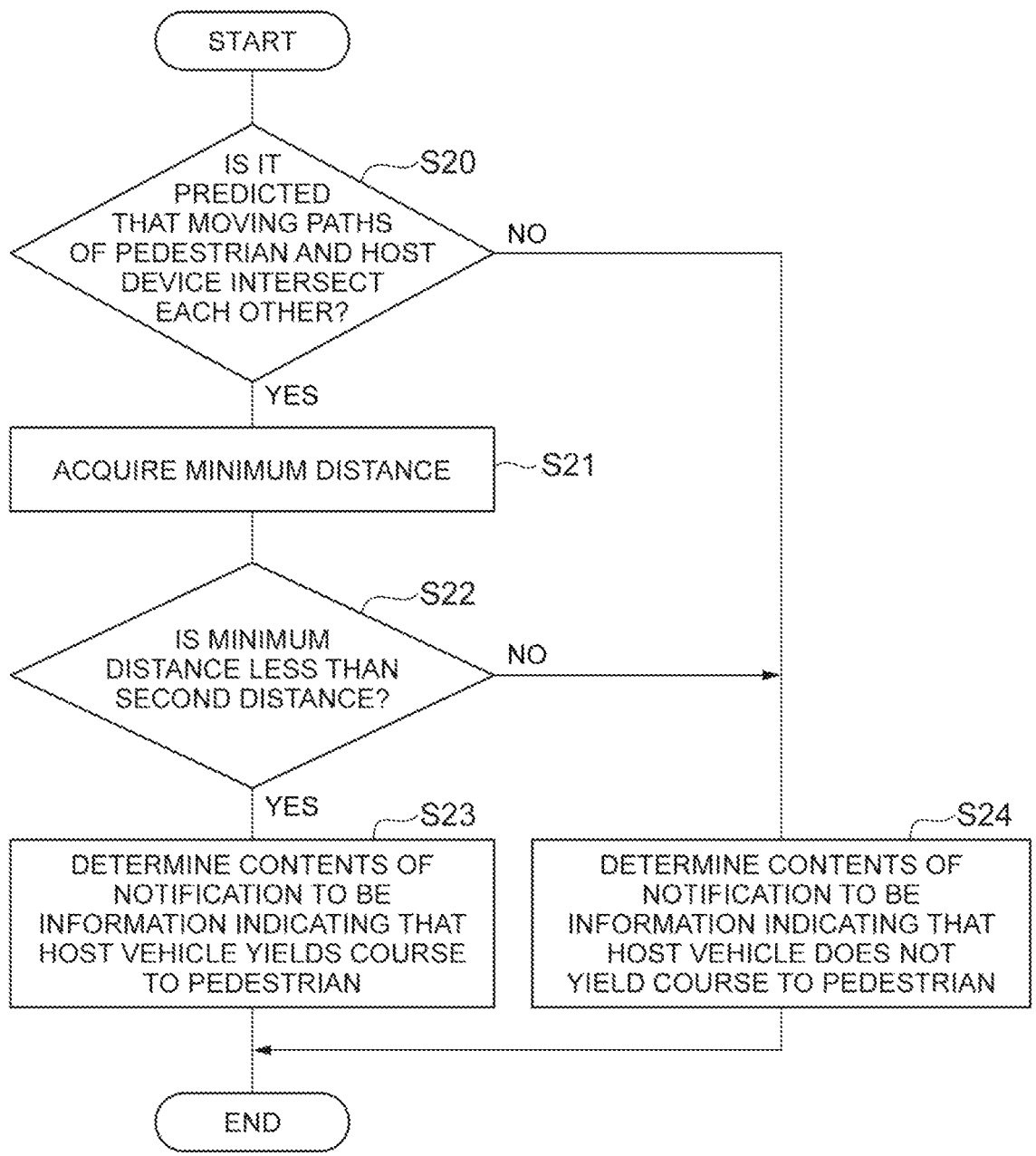
FIG. 8 is a flowchart illustrating a process of determining notification contents.

Subsequently, a process of determining notification contents in the vehicle external notification device 100 will be described with reference to the situations of FIGS. 4 and 5. FIG. 8 is a flowchart illustrating a process of determining notification contents. The process of determining notification contents corresponds to step S12 of FIG. 7.

As illustrated in FIG. 8, in step S20, the vehicle external notification device 100 predicts whether or not the moving paths T2 and T3 of the pedestrian P and the moving path T1 of the host vehicle V intersect each other, by the minimum distance acquisition unit 13. The minimum distance acquisition unit 13 predicts whether or not the moving paths T2 and T3 of the pedestrian P and the moving path T1 of the host vehicle V intersect each other, on the basis of the future action of the pedestrian P and the action schedule of the host vehicle V which are predicted by the action schedule unit 11. When it is predicted that the moving paths T2 and T3 of the pedestrian P and the moving path T1 of the host vehicle V intersect each other (step S20: YES) as illustrated in FIGS. 4 and 5, the vehicle external notification device 100 proceeds to step S21. On the other hand, when it is predicted that the moving paths T2 and T3 of the pedestrian P and the moving path T1 of the host vehicle V do not intersect each other (step S20: NO), the vehicle external notification device 100 proceeds to step S24.

In step S21, the vehicle external notification device 100 acquires a minimum distance between the pedestrian P and the host vehicle V by the minimum distance acquisition unit 13. The minimum distance acquisition unit 13 acquires the minimum distance between the pedestrian P and the host vehicle V, on the basis of the future action of the pedestrian P and the action schedule of the host vehicle V which are predicted by the action schedule unit 11. Thereafter, the vehicle external notification device 100 proceeds to step S22.

In step S22, the vehicle external notification device 100 determines whether or not the minimum distance acquired by the minimum distance acquisition unit 13 is less than the second distance, by the notification control unit 14. When it is determined that the minimum distance is less than the second distance (step S22: YES), the vehicle external notification device 100 proceeds to step S23. On the other hand, when it is determined that the minimum distance is equal to or greater than the second distance (step S22: NO), the vehicle external notification device 100 proceeds to step S24.

In step S23, the vehicle external notification device 100 determines the information on the action schedule of the host vehicle V, which is to be notified by the notification unit 4, to be the "information indicating that the host vehicle V yields the course to the pedestrian P" by the notification control unit 14. When contents of the notification are determined, the vehicle external notification device 100 terminates the current process. Meanwhile, in this case, the host vehicle V temporarily stops or reduces its speed so that the pedestrian P can pass by before the host vehicle V.

On the other hand, in step S24, the vehicle external notification device 100 determines the information on the action schedule of the host vehicle V, which is to be notified by the notification unit 4, to be the "information indicating that the host vehicle V does not yield the course to the pedestrian P" by the notification control unit 14. When contents of the notification are determined, the vehicle external notification device 100 terminates the current process. Meanwhile, in this case, the host vehicle V confirms that there is no concern that the action of the pedestrian P is interrupted, and passes by before the pedestrian P without temporarily stopping or reducing its speed. Meanwhile, the flowchart of FIG. 8 is also terminated, for example, when the automatic driving of the host vehicle V is terminated.

Subsequently, a process of changing notification means in the vehicle external notification device 100 will be described with reference to the situations of FIGS. 5 and 6. FIG. 9 is a flowchart illustrating a process of changing notification means. The process of changing notification means corresponds to step S17 of FIG. 7.

As illustrated in FIG. 9, in step S30, the ECU 10 of the vehicle external notification device 100 determines whether or not the distance D between the host vehicle V and the pedestrian P is set to be the first distance which is set in advance, by the notification control unit 14. The notification control unit 14 determines whether or not the distance D between the host vehicle V and the pedestrian P is set to be the first distance which is set in advance, on the basis of information (image capture information, obstacle information) received from the external sensor 1. In FIG. 6, the distance D is set to be the first distance. When it is determined that the distance D between the host vehicle V and the pedestrian P is set to be the first distance which is set in advance (step S30: YES), the vehicle external notification device 100 proceeds to step S31. On the other hand, in FIG. 5, the distance D is not set to be the first distance. When it is determined that the distance D between the host vehicle V and the pedestrian P is not set to be the first distance which is set in advance (step S30: NO), the vehicle external notification device 100 terminates the current process and repeatedly performs the process from step S30 again.

In step S31, the ECU 10 of the vehicle external notification device 100 stops causing the first notification unit 4a to give notice of the information on the action schedule of the host vehicle V and causes the second notification unit 4b to give notice of the information on the action schedule of the host vehicle V. Thereby, it is possible to recognize the information on the action schedule of the host vehicle V from the side of the host vehicle V. That is, the information on the action schedule of the host vehicle V can be visually recognized by the pedestrian P positioned beside the host vehicle V. When the ECU stops causing the first notification unit 4a to give notice of the information on the action schedule of the host vehicle V and causes the second notification unit 4b to give notice of the information on the action schedule of the host vehicle V, the vehicle external notification device 100 terminates the current process. Meanwhile, the flowchart of FIG. 9 is also terminated, for example, when the automatic driving of the host vehicle V is terminated.

As described above, according to the vehicle external notification device 100, it is predicted whether or not the pedestrian P advances in parallel with the host vehicle V, on the basis of the future action schedule of the host vehicle V during the automatic driving and the predicted future action of the pedestrian P which is detected in front of the host vehicle V. When it is predicted that the pedestrian P does not advance in parallel with the host vehicle V, the first notification unit 4a gives notice of the information on the future action schedule of the host vehicle V so as to be recognizable from the front of the host vehicle V. Thereby, the vehicle external notification device 100 can notify the pedestrian P, who is predicted not to advance in parallel with the host vehicle V, of the information on the future action schedule of the host vehicle V even when the pedestrian P is positioned in front of the host vehicle V. On the other hand, when it is predicted that the pedestrian P advances in parallel with the host vehicle V, the second notification unit 4b gives notice of the information on the future action schedule of the host vehicle V so as to be recognizable from the side of the host vehicle V at a timing when the pedestrian P is positioned at the first distance from the host vehicle V in the traveling direction of the host vehicle V. Thereby, the vehicle external notification device 100 can notify the pedestrian P, who is predicted to advance in parallel with the host vehicle V, of the information on the future action schedule of the host vehicle V, for example, at a timing when a positional relationship making it easier for the pedestrian P to recognize information notified at the side of the host vehicle V than information notified in front of the host vehicle V is established before the host vehicle V passes by the vicinity of the pedestrian P. Accordingly, the vehicle external notification device 100 can predict the future action of the pedestrian P and can give notice in accordance with the predicted action. As a result, it is possible to more early and more reliably inform the pedestrian P of the future action schedule of the host vehicle V during automatic driving.

The vehicle external notification device 100 includes the minimum distance acquisition unit 13 that acquires a minimum distance which is a distance when the pedestrian P and the host vehicle V are closest to each other, on the basis of the future action of the pedestrian P and the future action schedule of the host vehicle V which are predicted by the action schedule unit 11, and the notification control unit 14 causes the first notification unit 4a or the second notification unit 4b to give notice of the information indicating that the host vehicle V yields the course to the pedestrian P as the information on the future action schedule of the host vehicle V, when the minimum distance acquired by the minimum distance acquisition unit 13 is less than the second distance, and causes the first notification unit 4a or the second notification unit 4b to give notice of the information indicating that the host vehicle V does not yield the course to the pedestrian P as the information on the future action schedule of the host vehicle V, when the minimum distance acquired by the minimum distance acquisition unit 13 is equal to or greater than the second distance. Thereby, the host vehicle V can select a more preferred action as an action schedule regarding whether to yield the course to the pedestrian P on the basis of the minimum distance between the host vehicle and the pedestrian P, and can inform the pedestrian P of the action schedule.

The above-described embodiment can be implemented in various configurations having been subjected to various modifications and improvements on the basis of the knowledge of those skilled in the art.

For example, the first notification unit 4a may be a sound output device that outputs a sound so as to be capable of audibly recognizing the information on the future action schedule of the host vehicle V from the front of the host vehicle V. Specifically, the first notification unit 4a may be a speaker that outputs a sound toward the front of the host vehicle V. In particular, the first notification unit 4a may be a parametric speaker which is a speaker having high directivity. For example, the first notification unit 4a may output a sound of "please go first" as information indicating that the host vehicle yields the course to the pedestrian P, or may output a sound of "I will pass first" as information indicating that the host vehicle does not yield the course to the pedestrian P.

In addition, the second notification unit 4b may be a sound output device that outputs a sound so as to be capable of audibly recognizing the information on the future action schedule of the host vehicle V from the side of the host vehicle V. Specifically, the second notification unit 4b may be a speaker that outputs a sound toward the side of the host vehicle V. In particular, the second notification unit 4b may be a parametric speaker which is a speaker having high directivity. For example, the second notification unit 4b may output a sound of "please go first" as information indicating that the host vehicle yields the course to the pedestrian P, or may output a sound of "I will pass first" as information indicating that the host vehicle does not yield the course to the pedestrian P.

In addition, the vehicle external notification device 100 may not include the minimum distance acquisition unit 13. In this case, the vehicle external notification device 100 may determine the information on the action schedule of the host vehicle V, which is to be notified by the notification unit 4, on the basis of conditions other than the minimum distance between the pedestrian P and the host vehicle V.

When it is predicted in step S13 that the pedestrian P advances in parallel with the host vehicle V, the ECU 10 of the vehicle external notification device 100 may not cause the first notification unit 4a to give notice of the information on the action schedule of the host vehicle V by the notification control unit 14 until a timing when the distance D between the host vehicle V and the pedestrian P is set to be the first distance which is set in advance, in step S16.

When it is determined in step S30 that the distance D between the host vehicle V and the pedestrian P is set to be the first distance which is set in advance, the ECU 10 of the vehicle external notification device 100 may not only cause the first notification unit 4a but also cause the second notification unit 4b to give notice of the information on the action schedule of the host vehicle V without stopping causing the first notification unit 4a to give notice of the information on the action schedule of the host vehicle V, in step S31.

What is claimed is:

1. A vehicle external notification device that gives notice of information on a future action schedule of a host vehicle during automatic driving so as to be recognizable from an outside of a vehicle, the vehicle external notification device comprising:

a first display configured to give notice of the information on the future action schedule so as to be recognizable from a front of the host vehicle;

a second display configured to give notice of the information on the future action schedule so as to be recognizable from a side of the host vehicle; and an external sensor configured to detect a moving object in a vicinity of the host vehicle;

one or more processors further configured to:

predict a future action of the moving object which is detected in front of the host vehicle by the external sensor;

predict whether or not the moving object advances in parallel with the host vehicle, on the basis of the future action schedule and the future action of the moving object which is predicted; and cause the first display to give notice of the information on the future action schedule when the moving object does not advance in parallel with the host vehicle, and cause the first display to stop giving notice of the information and cause the second display to start giving notice of the information on the future action schedule at a timing when (i) the moving object is positioned at a first distance from the host vehicle in a traveling direction of the host vehicle, and (ii) there is a prediction that the moving object advances in parallel with the host vehicle.

2. The vehicle external notification device according to claim 1, wherein the one or more processors are further configured to acquire a minimum distance which is a distance when the moving object and the host vehicle are closest to each other, on the basis of the future action schedule and the future action of the moving object which is predicted, cause the first display to give notice of information indicating that the host vehicle yields a course to the moving object, as the information on the future action schedule, when the minimum distance acquired is less than a second distance, and cause the first display to give notice of information indicating that the host vehicle does not yield a course to the moving object, as the information on the future action schedule, when the minimum distance is equal to or greater than the second distance.

* * * * *